US009621447B2

(12) United States Patent
Thapliya

(10) Patent No.: US 9,621,447 B2
(45) Date of Patent: Apr. 11, 2017

(54) BANDWIDTH MEASURING DEVICE, BANDWIDTH MEASURING METHOD AND NON-TRANSITORY COMPUTER READABLE MEDIUM

(71) Applicant: FUJI XEROX CO., LTD., Tokyo (JP)

(72) Inventor: Roshan Thapliya, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 78 days.

(21) Appl. No.: 14/705,450

(22) Filed: May 6, 2015

(65) Prior Publication Data

US 2015/0236938 A1 Aug. 20, 2015

Related U.S. Application Data

(63) Continuation of application No. PCT/JP2013/071039, filed on Aug. 2, 2013.

(30) Foreign Application Priority Data

Jan. 10, 2013 (JP) ................................ 2013-002921

(51) Int. Cl.
*H04L 12/26* (2006.01)
*H04L 12/801* (2013.01)

(52) U.S. Cl.
CPC ...... *H04L 43/0894* (2013.01); *H04L 43/0847* (2013.01); *H04L 47/11* (2013.01)

(58) Field of Classification Search
CPC ... H04L 43/0894; H04L 47/11; H04L 43/0847
USPC ........................................ 370/229, 230, 232
See application file for complete search history.

(56) References Cited

U.S. PATENT DOCUMENTS 6,757,255 B1 6/2004 Aoki et al.
2008/0219164 A1* 9/2008 Shimonishi ......... H04L 41/0896 370/235
2010/0142395 A1* 6/2010 Yasuie ................ H04L 43/0888 370/252
2013/0223221 A1* 8/2013 Xu ...................... H04L 43/0876 370/235

FOREIGN PATENT DOCUMENTS

JP 2000-106557 A 4/2000

* cited by examiner

*Primary Examiner* — Obaidul Huq
(74) *Attorney, Agent, or Firm* — Sughrue Mion, PLLC

(57) ABSTRACT

There is provided a bandwidth measuring device. An extracting unit extracts, as a cutoff frequency, a highest frequency component among frequency components obtained by Fourier transform on transition data indicating a transition of communication congestion traffic with respect to a time in a communication network. A determining unit determines, based on a relationship between an error ratio and the measurement times in a cycle of the cutoff frequency, a minimum value of the measurement times that satisfy an error ratio. A setting unit sets each of measurement cycle and time so as to satisfy both conditions of a maximum value in the measurement cycle determined based on the cutoff frequency and the minimum value of the measurement times in the cycle corresponding to the determined cutoff frequency. A measuring unit measures a bandwidth of communication performed by using the network, based on the set measurement cycle and time.

9 Claims, 12 Drawing Sheets

MEASUREMENT TIME SETTING PROCESSING

S1001: OBTAIN BANDWIDTH CONGESTION INFORMATION

S1002: CALCULATE CUTOFF FREQUENCY fc BY PERFORMING FFT

S1003: DETERMINE THE NUMBER OF MEASUREMENT TIME IN CYCLE (1/fc) THAT SATISFIES SPECIFIED ERROR RATIO

S1004: DETERMINE MEASUREMENT INTERVAL T

S1005: DETERMINE MEASUREMENT TIME τ IN T BASED ON M AND T

RETURN

FIG. 3

| FILE NAME | QUALITIES | | | COMMUNICATION SYSTEM/BANDWIDTH | | | DISTRIBUTION URL |
|---|---|---|---|---|---|---|---|
| | FRAME RATE | RESOLUTION | BIT RATE | 3 G | 3.5 G | 3.9 G | |
| aaa | 30 | 400 × 224 P | 200 kbps | L ( ~ $BW_{A1}$) | Ultra - L ( ~ $BW_{B1}$) | Ultra - L ( ~ $BW_{C1}$) | http://a/aaa.1 |
| | 30 | 400 × 224 P | 400 kbps | M ($BW_{A1}$ ~ $BW_{A2}$) | | | http://a/aaa.2 |
| | 30 | 400 × 224 P | 800 kbps | H ($BW_{A2}$ ~ ) | L ($BW_{B1}$ ~ $BW_{B2}$) | | http://a/aaa.3 |
| | 30 | 640 × 360 P | 1.2 Mbps | — | M ($BW_{B2}$ ~ $BW_{B3}$) | L ($BW_{C1}$ ~ $BW_{C2}$) | http://a/aaa.4 |
| | 30 | 852 × 480 P | 2.0 Mbps | — | H ($BW_{B3}$ ~ ) | M ($BW_{C2}$ ~ $BW_{C3}$) | http://a/aaa.5 |
| | 30 | 1280 × 720 P | 6.0 Mbps | — | — | H ($BW_{C3}$ ~ ) | http://a/aaa.6 |
| | | | | | | | |

BANDWIDTH MEASURING DEVICE, BANDWIDTH MEASURING METHOD AND NON-TRANSITORY COMPUTER READABLE MEDIUM

CROSS-REFERENCE TO RELATED APPLICATIONS

This is a continuation of International Application No. PCT/JP2013/071039 filed on Aug. 2, 2013, and claims priority from Japanese Patent Application No. 2013-002921, filed on Jan. 10, 2013.

TECHNICAL FIELD

The present invention relates to a bandwidth measuring device, a bandwidth measuring method and a non-transitory computer readable medium.

Summary

According to an aspect of the exemplary embodiments of the present invention, there is provided a bandwidth measuring device including: an extracting unit that extracts, as a cutoff frequency, a highest frequency component among frequency components obtained by performing Fourier transform on transition data which indicates a transition of communication congestion traffic with respect to a time in a communication network to be used a determining unit that determines, on the basis of a relationship between an error ratio and the number of measurement times in a cycle corresponding to the cutoff frequency, a minimum value of the number of measurement times that satisfy a given error ratio; a setting unit that sets each of a measurement cycle and a measurement time so as to satisfy both conditions of a maximum value in the measurement cycle determined on the basis of the cutoff frequency and the minimum value of the number of measurement times in the cycle corresponding to the cutoff frequency determined by the determining unit; and a measuring unit that measures a bandwidth of communication performed by using the communication network, on the basis of the measurement cycle and the measurement time set by the setting unit.

BRIEF DESCRIPTION OF DRAWINGS

Exemplary embodiments of the present invention will be described in detail based on the following figures, wherein:

FIG. 3 is a diagram illustrating an example of a distribution video data management table;

DETAILED DESCRIPTION

A mode for carrying out the present invention (hereinafter referred to as an “exemplary embodiment”) will be described below with reference to the drawings.

[System Block Diagram]

Figure 1:
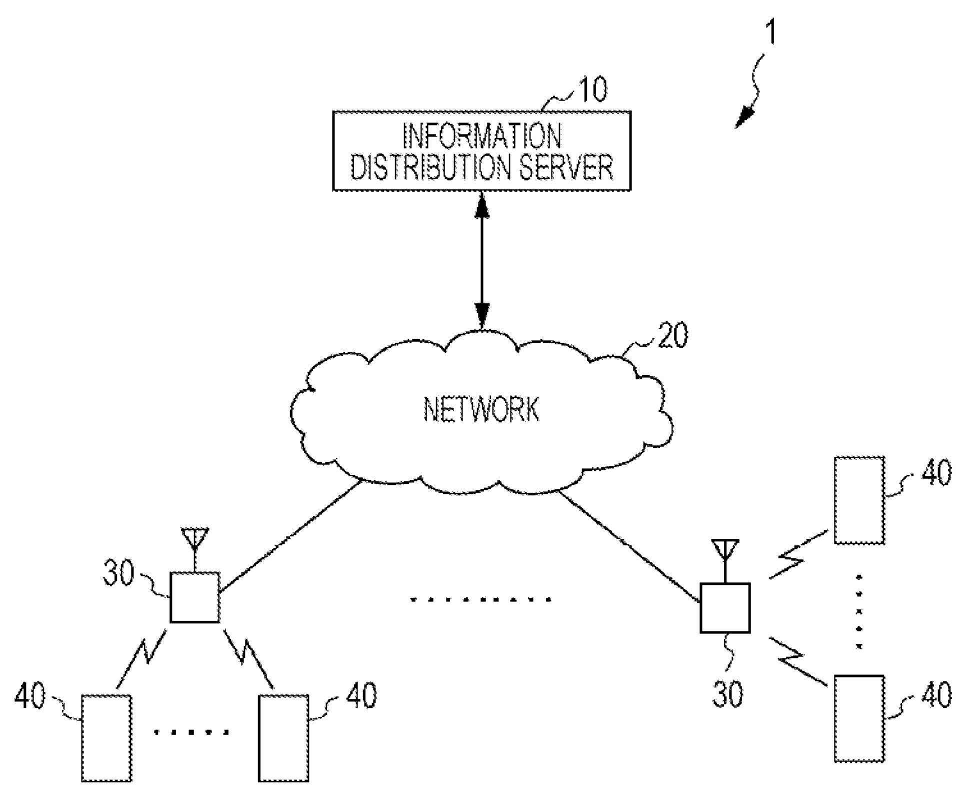
FIG. 1 is a system block diagram of an information distribution system according to an exemplary embodiment of the present invention.

FIG. 1 is a system block diagram of an information distribution system 1 according to an exemplary embodiment of the present invention. As shown in FIG. 1, the information distribution system 1 includes an information distribution server 10, one or more base station devices 30, and one or more client devices 40. The information distribution server 10 and each base station device 30 communicate with each other via a network 20, such as an optical communication network, and a base station device 30 and a client device 40 perform wireless communication, such as mobile communication or wireless LAN communication, with each other, thereby implementing communication between the information distribution server 10 and each client device 40.

The information distribution server 10 is a computer that stores data, such as video, and provides data in response to a request from a client device 40. In this case, the information distribution server 10 selects qualities (such as the resolution and the size) of data (video) requested by the client device 40, on the basis of the communication bandwidth (BW) between the client device 40 and the information distribution server 10, and provides data of the selected qualities to the client device 40.

The base station device 30 is a device that performs wired communication with the information distribution server 10 and performs wireless communication, such as mobile communication, with each client device 40. Wireless communication between the base station device 30 and the client device 40 may be performed by using various communication systems, such as 30 and 40 mobile communication.

The client device 40 is a computer, such as a cellular phone (including a multi-function cellular phone), a tablet terminal, or a personal computer, operated by a user. The client device 40 performs wireless communication with the base station device 30 and performs data communication with the information distribution server 10 via the base station device 30. This enables the client device 40 to receive distribution of, for example, video, from the information distribution server 10. The client device 40 also measures the communication bandwidth (BW) between the client device 40 and the information distribution server 10 for a preset measurement time (τ) at regular preset measurement intervals (T). The measurement interval (T) and the measurement time (τ) are set on the basis of communication congestion status transition data (Congestion Profile) indicating the transition of the congestion status of a network with respect to the time. Details of processing for setting the measurement interval (T) and the measurement time (τ) will be discussed later.

An example of the processing performed by the information distribution system 1 according to an exemplary embodiment of the present invention is as follows. Upon receiving a request to receive video distribution from the information distribution server 10 from a user, the client device 40 establishes communication with the information distribution server 10. Then, the client device 40 measures the communication bandwidth (BW) between the information distribution server 10 and the client device 40, on the basis of the measurement interval (T) and the measurement time (T) which are optimized to a temporal transition of the congestion status (for example, traffic) of a network. Then, the client device 40 sends the measured communication bandwidth, together with specifying information (for example, URL) which specifies the video to be requested, to the information distribution server 10. The information distribution server 10 selects video qualities (such as the resolution and the hit rate) of the video specified by the specifying information, on the basis of the communication bandwidth received from the client device 40, and sends a video-distribution URL corresponding to the selected video qualities to the client device 40. The client device 40 accesses the video-distribution URL sent from the information distribution server 10 and receives the distribution of the video of qualities which are optimized to the communication bandwidth between the client device 40 and the information distribution server 10. The client device 40 then plays back the distributed video (for example, by stream playback).

[Hardware Block Diagram]

Figure 2:
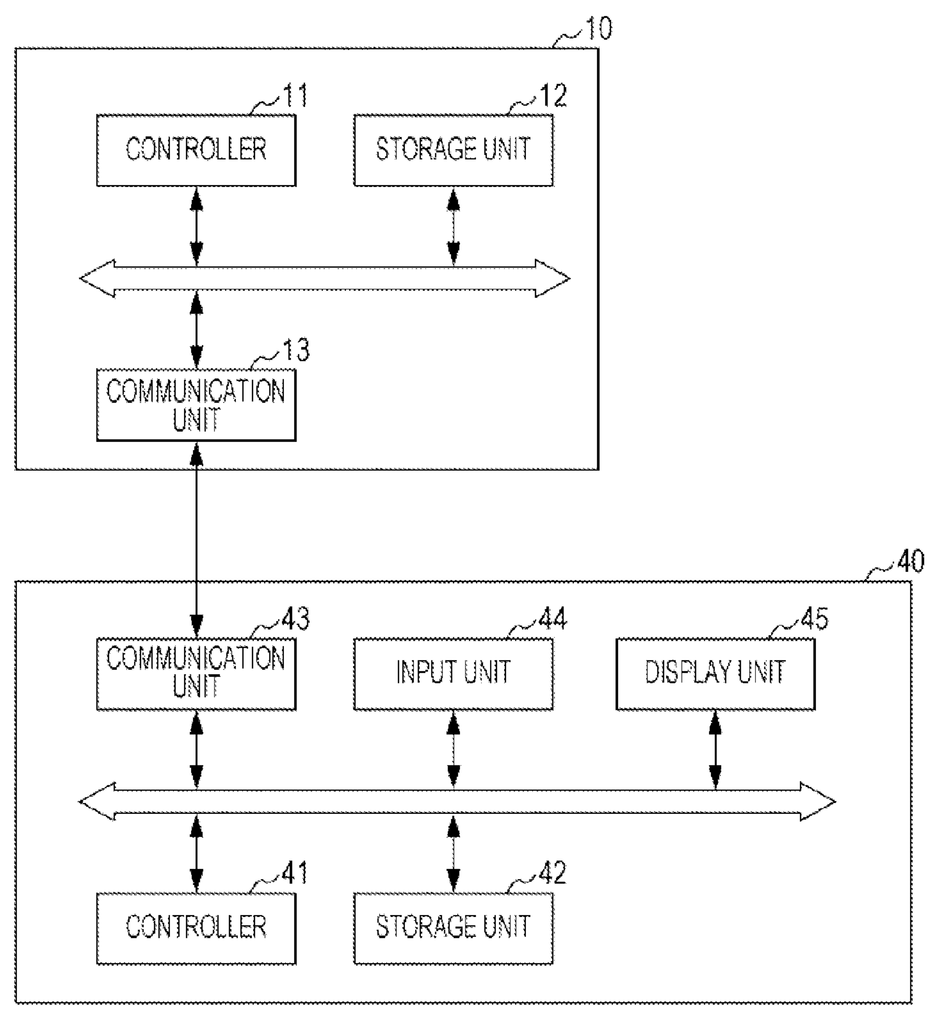
FIG. 2 is a diagram illustrating an example of the hardware configuration of each of an information distribution server and a client device.

The elements of each of the information distribution server 10 and the client device 40 provided for performing the above-described processing will be described below with reference to FIG. 2.

[Information Distribution Server 10]

An example of the hardware configuration of the information distribution server 10 will first be discussed. As shown in FIG. 2, the information distribution server 10 includes a controller 11, a storage unit 12, and a communication unit 13.

The controller 11 includes a CPU (Central Processing Unit) and executes various arithmetic operations and also controls the individual elements of the information distribution server 10, on the basis of a program stored in the storage unit 12.

The storage unit 12 stores a program, such as an operating system of the information distribution server 10, and data therein, and is also used as a work memory of the controller 11. The program may be stored in an information storage medium, such as an optical disc, a magnetic disk, magnetic tape, a magneto-optical disk, or a flash memory, and be supplied to the information distribution server 10. Alternatively, the program may be supplied to the information distribution server 10 via data communication means, such as the Internet. An example of the data stored in the storage unit 12 will be described below.

In the storage unit 12, for example, video data (video files) and a distribution video data management table indicating qualities of video data to be distributed which are determined in accordance with each communication bandwidth, are stored.

An example of the distribution video data management table is shown in FIG. 3. As shown in FIG. 3, in the distribution video data management table, the file name of video data, qualities (frame rate, resolution, and bit rate), ranks (ranges) of communication bandwidths, and video-distribution URLs are stored in association with each other. The rank of a communication bandwidth may be determined for each communication system.

The communication unit 13 is implemented as a network interface card, and performs data communication with the base station device 30 and the like via a network and also performs data communication with the client device 40 and the like via the base station device 30.

[Client Device 40]

An example of the hardware configuration of the client device 40 will now be discussed below. As shown in FIG. 2, the client device 40 includes a controller 41, a storage unit 42, a communication unit 43, an input unit 44, and a display unit 45.

The controller 41 includes a CPU (Central Processing Unit) and executes various arithmetic operations and also controls the individual elements of the client device 40, on the basis of a program stored in the storage unit 42.

The storage unit 42 stores a program, such as en operating system of the client device 40, and data therein, and is also used as a work memory of the controller 41. The program may be stored in an information storage medium, such as an optical disc, a magnetic disk, magnetic tape, a magneto-optical disk, or a flash memory, and be supplied to the client device 40. Alternatively, the program may be supplied to the client device 40 via data communication means, such as the Internet.

In the storage unit 42, for example, transition data indicating the congestion status of a network with respect to the time (communication congestion status transition data) may be stored.

Figure 4:
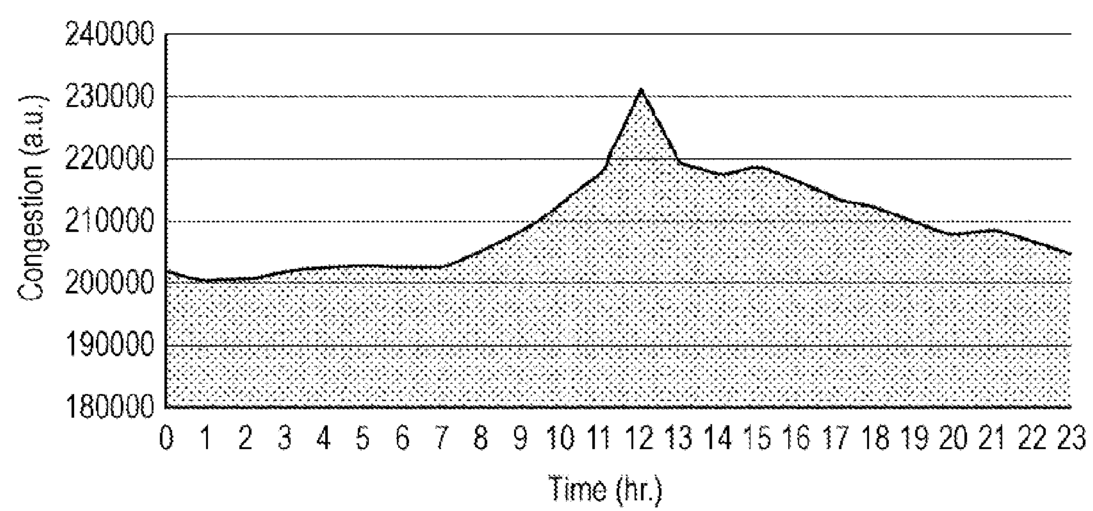
FIG. 4 is a diagram illustrating an example of communication congestion status transition data.

An example of the communication congestion status transition data is shown in FIG. 4. In the example of the communication congestion status transition data shown in FIG. 4, the horizontal axis indicates the time (0 to 23 (hour)) and the vertical axis indicates the communication congestion traffic. The communication congestion traffic may be data based on, for example, packets to be communicated, loss packets, packet delay time. This communication congestion status transition data may be obtained as a result of the client device 40 measuring the communication congestion on the basis of packets regularly sent to the information distribution server 10, or may be obtained from another device or a storage medium. The communication congestion status transition data may be set according to the month or the day of the week.

The communication unit 43 includes, for example, a wireless communication antenna, and communicates with the base station device 30 via the wireless communication antenna.

The input unit 44 is implemented by an input device, such as a touch panel or a keyboard, and receives input of an operation from a user.

The display unit 45 is implemented by a display device, such as a liquid crystal display, and displays results (screen) of information processing executed by the controller 41.

[Sequence]

Details of processing executed by the information distribution system 1 according to first through third exemplary embodiments will now be described below with reference to the sequence diagrams and the flow diagrams of FIGS. 5 through 11.

[First Exemplary Embodiment]

Processing according to the first exemplary embodiment will first be described below with reference to FIGS. 5 through 7. The first exemplary embodiment is concerned with an example of processing in a case in which the client device 40 measures the communication bandwidth (BW)

when sending a video distribution request and sends information concerning the communication bandwidth (BW) to the information distribution server 10.

Figure 5:
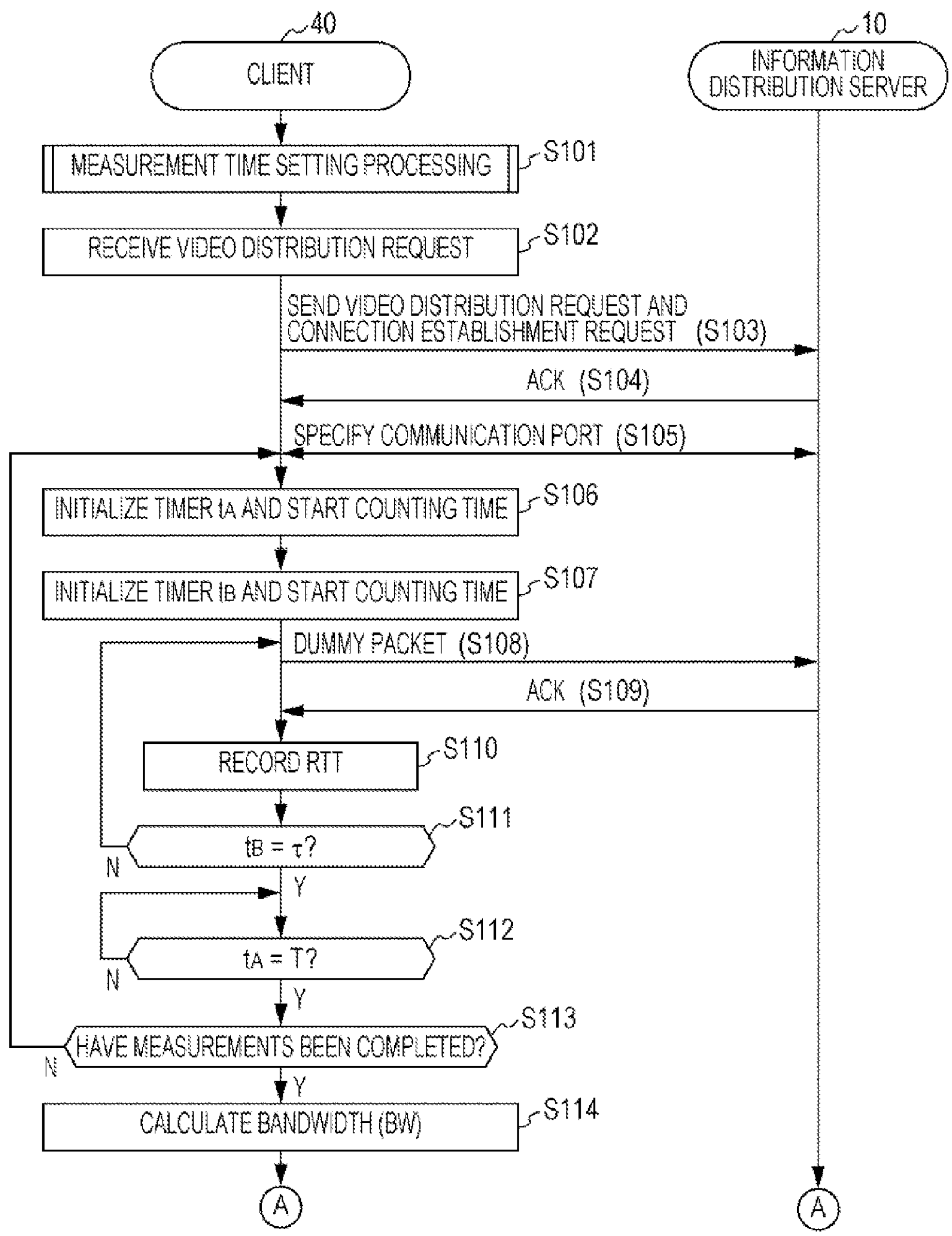
FIG. 5 is a sequence diagram of video distribution processing according to a first exemplary embodiment.
Figure 6:
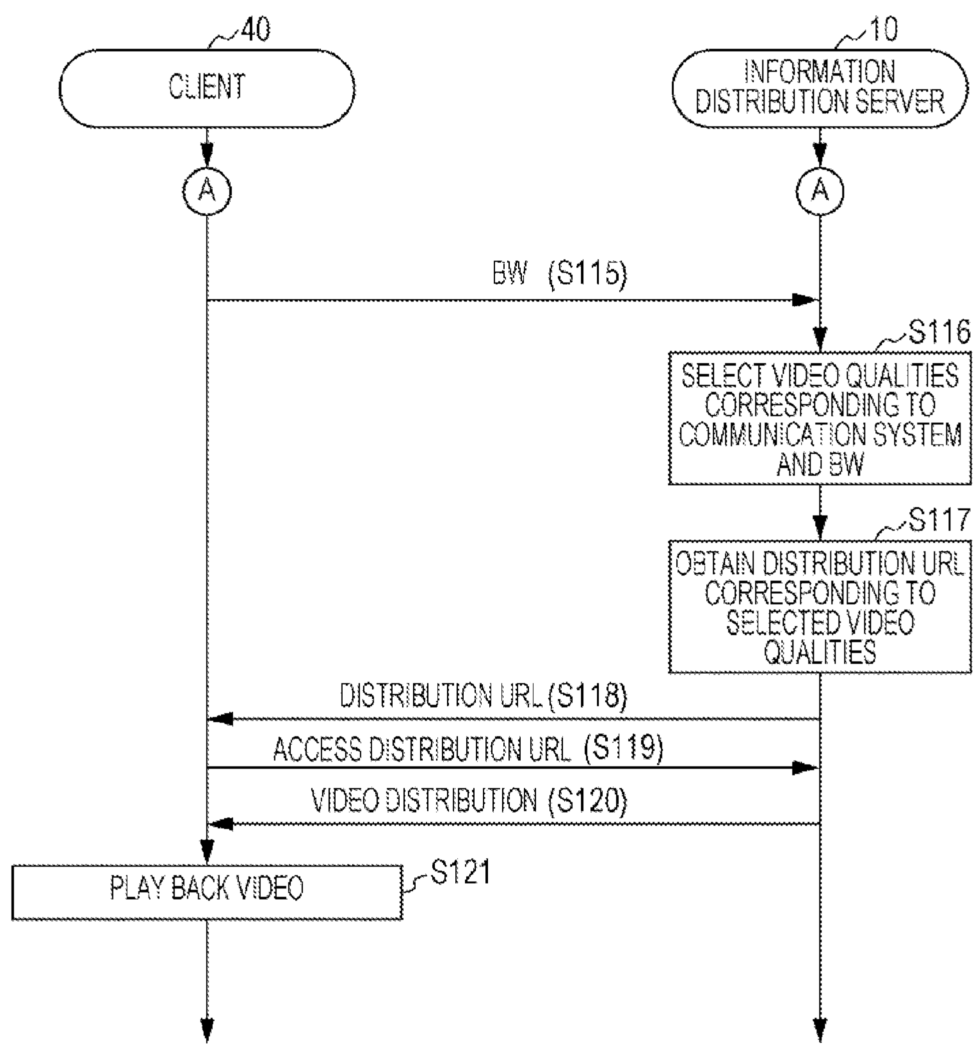
FIG. 6 is a sequence diagram of video distribution processing according to the first exemplary embodiment.

A sequence diagram of video distribution processing to be executed when the client device 40 sends a video distribution request to the information distribution server 10 is shown in FIGS. 5 and 6.

As shown in FIG. 5, as preprocessing, the client device 40 first executes measurement time setting processing for setting the time interval (T) and the measurement time (T) at and for which the communication bandwidth (BW) is measured (S101). Details of this measurement time setting processing will be discussed later.

Upon receiving a video distribution request from a user (S102), the client device 40 accesses the information distribution server 10 based on a link (URL) concerning the video distribution request and sends a video distribution request and a connection establishment request to the information distribution server 10 (S103).

Upon receiving a connection establishment request packet from the client device 40, the information distribution server 10 sends an acknowledgement response (ACK) to the connection establishment request packet to the client device 40 (S104).

Upon receiving the acknowledgement response (ACK) to the connection establishment request packet from the information distribution server 10, the client device 40 mutually identifies a communication port used for communication with the information distribution server 10 (S105).

Then, the client device 40 initializes a timer tA (tA=0) and starts counting the time by using the timer tA (S106). The client device 40 also initializes a timer tB (tB=0) and starts counting the time by using the timer tB (S107). Then, the client device 40 sends a dummy packet to which a time stamp for a sending time is appended to the information distribution server 10 (S108).

Upon receiving the dummy packet from the client device 40, the information distribution server 10 appends a time stamp for a sending time to an acknowledgement response (ACK) to the received dummy packet and sends the acknowledgement response (ACK) to the client device 40 (S109).

Upon receiving the acknowledgement response (ACK) to the dummy packet from the information distribution server 10, the client device 40 calculates a round-trip time (RTT) on the basis of the time interval between the time indicated by the time stamp of the dummy packet and that of the acknowledgement response (ACK), and records the calculated round-trip time (RTT) (S110). If the client device 40 has failed to receive ACK in response to the sent dummy packet, it may assume that packet loss has occurred and also record information concerning the occurrence of packet loss. If the timer tB has not reached $\tau$ (S111: N), the client device 40 returns to S108. If the timer tB has reached $\tau$ (S111: Y), the client device 40 determines whether or not the timer tA has reached T (S112).

If the timer tA has not reached T in S112 (S112: N), the client device 40 waits until the timer tA reaches T. If the timer tA has reached T (S112: Y), the client device 40 determines whether or not a measurement completion condition is satisfied (S113). For example, if the number of times dummy packets have been sent is equal to or greater than a number threshold, or if the time elapsed after measurements have started is equal to or greater than a time threshold, the client device 40 may determine that the measurement completion condition is satisfied.

If the measurement completion condition is not satisfied in S113 (S113: N), the client device 40 returns to S106. If the measurement completion condition is satisfied (S113: Y), the client device 40 measures the communication bandwidth (BW) on the basis of the recorded RTT and the packet loss ratio (p) (S114). For example, the communication bandwidth (BW) may be calculated by, for example, the following equation (1). In equation (1), RTT is the average (or may be the median) of recorded RTTs, p is the ratio of loss packets to the number of sent packets, and MSS (Maximum Segment Size) is the maximum segment size of segments forming received data. The equation used for calculating the communication bandwidth (BW) is not restricted to equation (1), and another equation may be used.

[Math. 1]

$$BW = \sqrt{\frac{3}{2}} \times \frac{MSS}{RTT \times \sqrt{p}} \quad (1)$$

Operations after step S114 will be described below with reference to FIG. 6.

As shown in FIG. 6, the client device 40 sends communication status information indicating the communication bandwidth (BW) calculated in S114 to the information distribution server 10 (S115). The communication status information may include information concerning the communication system of wireless communication (for example, the mobile communication system) used by the client device 40.

Upon receiving the communication status information including the information concerning the communication system and the communication bandwidth (BW) from the client device 40, the information distribution server 10 selects video qualities corresponding to the received communication system and communication bandwidth (BW) for the video data requested by the client device 40 by referring to the video distribution data management table (S116). For example, the information distribution server 10 may determine under which one of the ranks set for each communication system (for example, in mobile communication system A, L (lower than BWA1), M (BWA1 or higher and lower than BMA2), and H (BWA2 or higher) the communication bandwidth (BW) is classified, and may select video qualities (frame rate, resolution, and bit rate) corresponding to a set of the communication system and the rank.

The information distribution server 10 obtains the distribution URL for distributing the video data of the video qualities selected in S116 from the video distribution data management table (S117), and sends the obtained distribution URL to the client device 40 (S118) so as to redirect the client device 40 to the distribution URL.

The client device 40 accesses the distribution URL sent from the information distribution server 10 (S119), receives the distribution of the video data linked to the distribution URL from the information distribution server 10 (S120), and plays back the video data (S121).

The above-described processing is the overall flow of the video distribution processing to be executed when the client device 40 sends a video distribution request to the information distribution server 10.

[Flowchart of Measurement Time Setting Processing]

Details of the measurement time setting processing executed in S101 of FIG. 5 will be described below with reference to the flowchart of FIG. 7.

Figure 7:
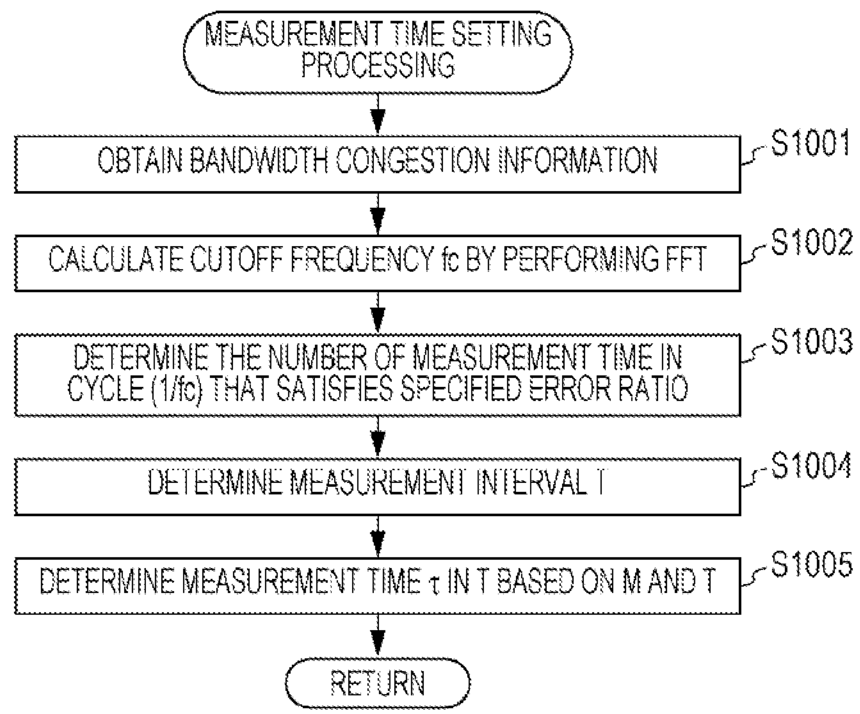
FIG. 7 is a flowchart of measurement time setting processing.

As shown in FIG. 7, the client device 40 obtains communication congestion status transition data (see FIG. 4) indicating the transition of the congestion status of a network with respect to the time (S1001). The communication congestion status transition data may be obtained as a result of the client device 40 measuring the communication congestion on the basis of packets regularly sent to the information distribution server 10, or may be obtained from another device or a storage medium. If the communication congestion status transition data is set according to the month or the day of the week, the client device 40 may obtain the communication congestion status transition data at a current date.

A description will now be given of the relationship between the communication congestion status transition data and a sampling function of a network. It is now assumed that the sampling function s(t) of a network is expressed by the following equation (2) when the sampling period (measurement cycle) is denoted by T and the measurement time is denoted by $\tau$, and that the communication congestion status transition data indicating the transition of the congestion status of a network with respect to time t is represented by c(t). In equation (2), rect is a rectangular function and $\delta$ is a delta function.

[Math. 2]

$$s(t) = rect\left(\frac{t}{\tau}\right) * \sum_{n=1}^{N} \delta(t - nT) \quad (2)$$

Then, a network valuation function NetEst(t) is expressed by the following equation (3) by using s(t) and c(t). The result of performing Fourier transform on NetEst (t) is expressed by equation (4). In equation (4), sinc is a sinc function, u is a frequency component, * is a convolution operator, and S(u) and C(u) are the results of performing Fourier transform on s(t) and c(t), respectively.

[Math. 3]

$$NetEst(t) = s(t) \times c(t) = \left(rect\left(\frac{t}{\tau}\right) * \sum_{n=1}^{N} \delta(t - nT)\right) \times c(t) \quad (3)$$

[Math. 4]

$$nETeST(u) = S(u) \times C(u) = \left(Sinc(u\tau) \times \sum_{m=1}^{N} \delta\left(u - \frac{m}{T}\right)\right) * C(u) \quad (4)$$

The client device 40 performs Fourier transform (for example, EFT) on the communication congestion status transition data so as to calculate the cutoff frequency fc (S1002). The cutoff frequency fc is the highest frequency component of C(u) obtained by performing Fourier transform on the communication congestion status transition data c(t).

The measurement cycle T and the cutoff frequency fc satisfy the following equation (5) according to the Nyquist theorem.

$$T \leq 1/(2 \cdot fc) \quad (5)$$

If the number of measurement times in the cycle (1/fc) corresponding to the cutoff frequency fc is indicated by M, $\tau$(M) is expressed by the following equation (6).

$$\tau(M) = 1/(M \cdot fc) \quad (6)$$

Figure 12:
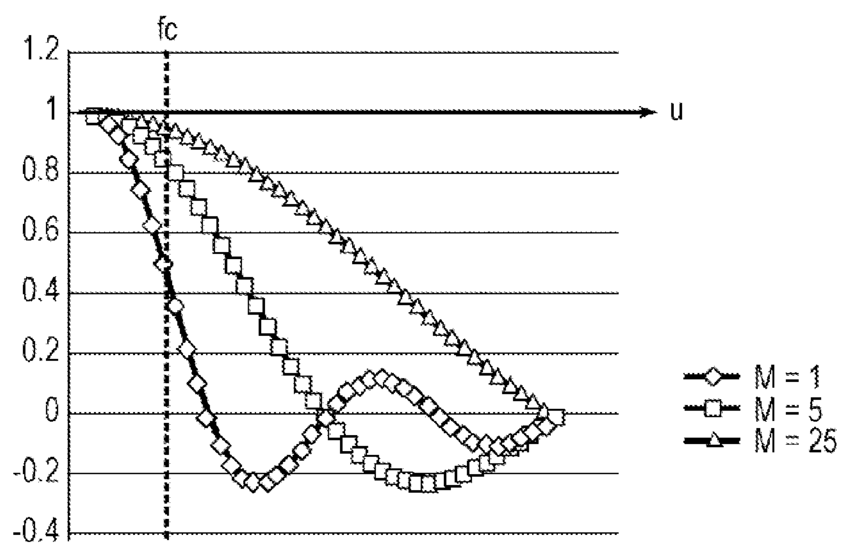
FIG. 12 is a graph of a function fM(u)

FIG. 12 is a graph of a function fM(u) concerning fM(U)=sinc($\pi u\tau$)=sinc($\pi$u/M·fc) when M is varied (for example, M=1, 5, 25). When M is 1 or greater, the error ratio e(M) with respect to u=fc is expressed by the following equation (7).

$$e(M) = 1 - (fM(fc) - f1(fc)) \quad (7)$$

Equation (7) may be reduced to the following equation.

$$e(M) = 1 - (\mathrm{sinc}(\pi/M) - \mathrm{sinc}(\pi)) = 1 - \mathrm{sinc}(\pi/M)$$

Figure 13:
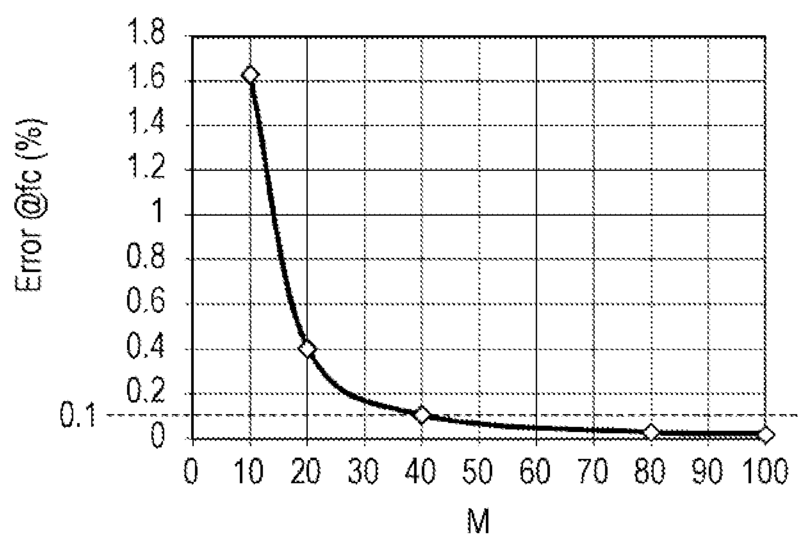
FIG. 13 is a graph illustrating the relationship between M and the error ratio.

FIG. 13 illustrates the relationship between M and the error ratio. In FIG. 13, the horizontal axis indicates N, and the vertical axis indicates the error ratio. If a desired error ratio is specified, the corresponding M is determined. For example, in the example shown in FIG. 13, if 0.1% or lower is specified as the error ratio, the corresponding M is about 43 or higher.

By referring back to the flowchart of FIG. 7, a description will continue. As discussed above, the client device 40 determines the minimum value Mmin of the number of measurement times M in the cycle (1/fc) that satisfy a specified error ratio (S1003).

Then, the client device 40 determines T that satisfies equation (5) (S1004). For example, the client device 40 may determine that T=1/(2·fc). Then, the client device 40 determines $\tau$ on the basis of M which is equal to or higher than Mmin determined in S1003, and also determines the duty ratio $\tau$/T (S1005). The client device 40 then returns. For example, in the case of Mmin=43, if M=100, $\tau$/T=1/50.

The above-described processing refers to the flow of processing according to the first exemplary embodiment. According to the processing of the first exemplary embodiment, it is possible to distribute video of a quality suited to the communication bandwidth (BW) at a time when the client device 40 has sent a video distribution request to the information distribution server 10. Additionally, each client device 40 measures the communication bandwidth (BW), thereby preventing the concentration of the processing load on the information distribution server 10.

[Second Exemplary Embodiment]

Processing according to a second exemplary embodiment performed by the information distribution system 1 of an exemplary embodiment of the present invention will now be described below with reference to FIGS. 8 and 9. The second exemplary embodiment is concerned with an example of processing in a case in which the information distribution server 10 measures the communication bandwidth (BW) when receiving a video distribution request.

Figure 8:
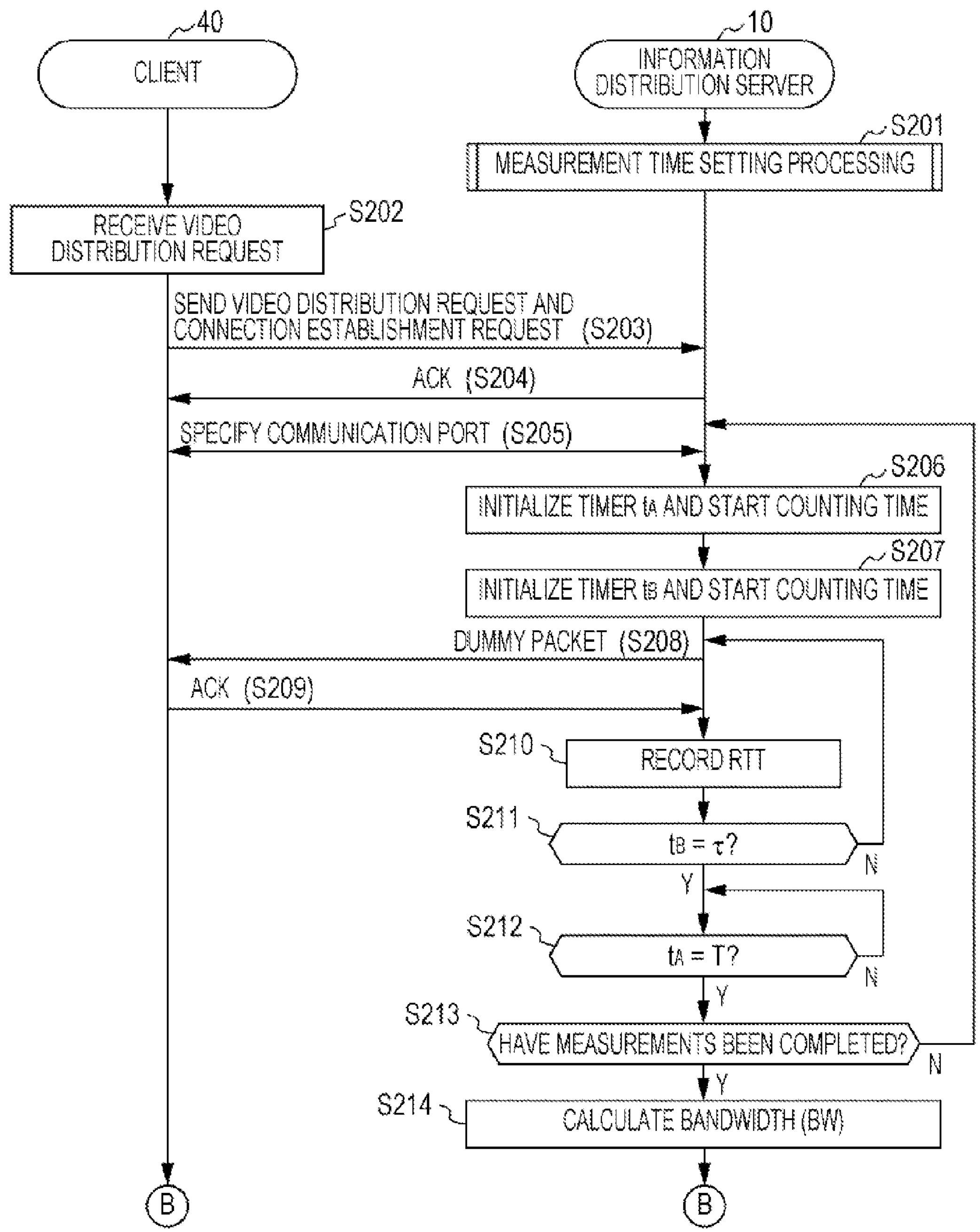
FIG. 8 is a sequence diagram of video distribution processing according to a second exemplary embodiment.
Figure 9:
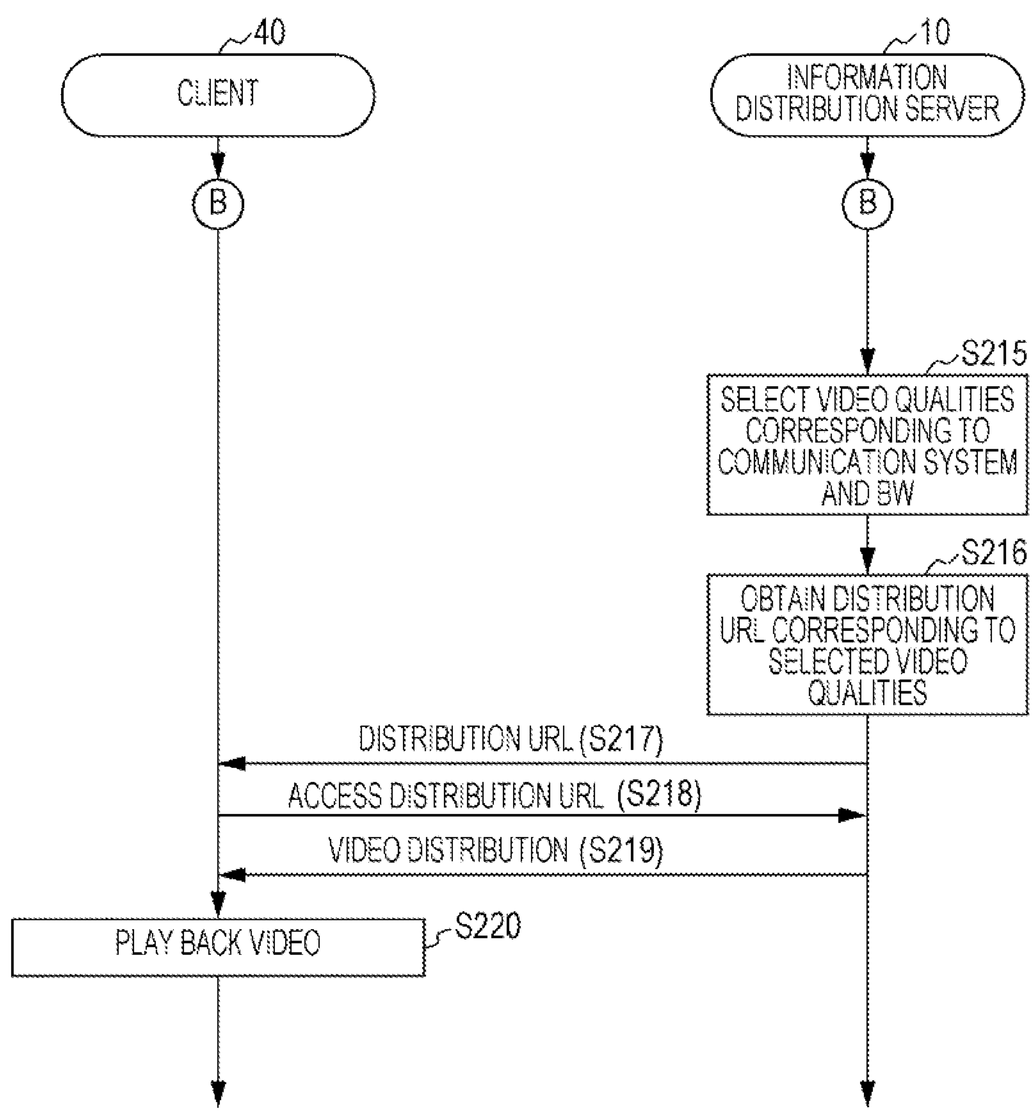
FIG. 9 is a sequence diagram of video distribution processing according to the second exemplary embodiment.

A sequence diagram of video distribution processing to be executed when the client device 40 sends a video distribution request to the information distribution server 10 is shown in FIGS. 8 and 9.

As shown in FIG. 8, as preprocessing, the information distribution server 10 first executes measurement time setting processing for setting the time interval (I) and the measurement time ($\tau$) at and for which the communication bandwidth (BW) is measured (S201). Details of this measurement time setting processing are indicated by the flowchart of FIG. 7, and an explanation thereof will thus be omitted here.

Upon receiving a video distribution request from a user (S202), the client device 40 accesses the information distribution server 10 based on a link (URL) concerning the video distribution request and sends a video distribution request and a connection establishment request to the information distribution server 10 (S203).

Upon receiving a connection establishment request packet from the client device 40, the information distribution server 10 sends an acknowledgement response (ACK) to the connection establishment request packet to the client device 40 (S204).

Upon receiving the acknowledgement response (ACK) to the connection establishment request packet from the information distribution server 10, the client device 40 mutually identifies a communication port used for communication with the information distribution server 10 (S205).

Then, the information distribution server 10 initializes a timer tA (tA=0) and starts counting the time by using the timer tA (S206). The information distribution server 10 also initializes a timer tB (tB=0) and starts counting the time by using the timer tB (S207). Then, the information distribution server 10 sends a dummy packet to which a time stamp for a sending time is appended to the client device 40 (S208).

Upon receiving the dummy packet from the information distribution server 10, the client device 40 appends a time stamp for a sending time to an acknowledgement response (ACK) to the received dummy packet and sends the acknowledgement response (ACK) to the information distribution server 10 (S209).

Upon receiving the acknowledgement response (ACK) to the dummy packet from the client device 40, the information distribution server 10 calculates a round-trip time (RTT) on the basis of the time interval between the time indicated by the time stamp of the dummy packet and that of the acknowledgement response (ACK), and records the calculated round-trip time (RTT) (S210). If the information distribution server 10 has failed to receive ACK in response to the sent dummy packet, it may assume that packet loss has occurred and also record information concerning the occurrence of packet loss. If the timer tB has not reached τ (S211: N), the information distribution server 10 returns to S208. If the timer tB has reached τ (S211: Y), the information distribution server 10 determines whether or not the timer tA has reached T (S212).

If the timer tA has not reached T in S212 (S212: N), the information distribution server 10 waits until the timer tA reaches T. If the timer tA has reached T (S212: Y), the information distribution server 10 determines whether or not a measurement completion condition is satisfied (S213). For example, if the number of times dummy packets have been sent is equal to or greater than a number threshold, or if the time elapsed after measurements have started is equal to or greater than a time threshold, the information distribution server 10 may determine that the measurement completion condition is satisfied.

If the measurement completion condition is not satisfied in S213 (S213: N), the information distribution server 10 returns to S206. If the measurement completion condition is satisfied (S213: Y), the information distribution server 10 measures the communication bandwidth (BW) on the basis of the recorded RTT and the packet loss ratio (p) (S214). For example, the communication bandwidth (BW) may be calculated by, for example, the above-described equation (1).

Operations after step S214 will be described below with reference to FIG. 9.

As shown in FIG. 9, on the basis of information concerning a communication system used by the client device 40 and the calculated communication bandwidth (BW), the information distribution server 10 selects video qualities corresponding to the above-described communication system and communication bandwidth (BW) for the video data requested by the client device 40 by referring to the video distribution data management table (S215). For example, the information distribution server 10 may determine under which one of the ranks set for each communication system (for example, in mobile communication system A, L (lower than BWA1), M (BWA1 or higher and lower than BMA2), and H (BWA2 or higher) the communication bandwidth (BW) is classified, and may select video qualities (frame rate, resolution, and bit rate) corresponding to a set of the communication system and the rank.

The information distribution server 10 obtains the distribution URL for distributing the video data of the video qualities selected in S215 from the video distribution data management table (S216), and sends the obtained distribution URL to the client device 40 (S217) so as to redirect the client device 40 to the distribution URL.

The client device 40 accesses the distribution URL sent from the information distribution server 10 (S218), receives the distribution of the video data linked to the distribution URL from the information distribution server 10 (S219), and plays back the video data (S220).

The above-described processing refers to the overall flow of the video distribution processing to be executed when the client device 40 sends a video distribution request to the information distribution server 10.

According to the processing of the second exemplary embodiment, even in a case in which a client device 40 does not have a function of measuring the communication bandwidth (BW), video of a quality suited to the communication bandwidth (BW) at a time when the client device 40 has sent a video distribution request to the information distribution server 10 is distributed to the client device 40.

[Third Exemplary Embodiment]

Processing according to a third exemplary embodiment will now be described below with reference to FIGS. 10 and 11. The third exemplary embodiment is concerned with an example of processing in a case in which the client device 40 measures the communication bandwidth (BW) on a regular basis and stores it prior to the sending of a video distribution request, and sends information concerning the stored latest communication bandwidth (BW) to the information distribution server 10 when receiving a video distribution request.

Figure 10:
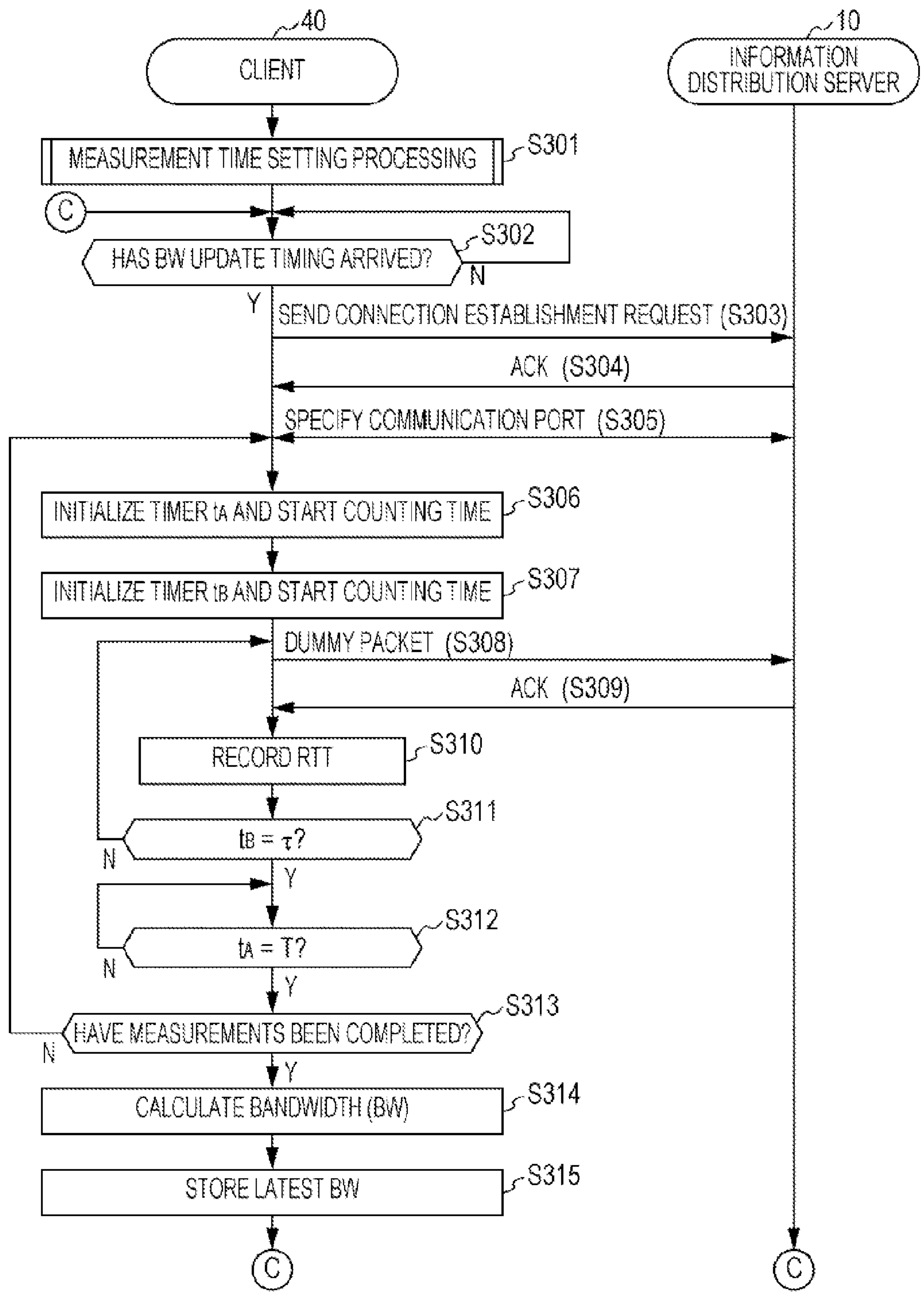
FIG. 10 is a sequence diagram of measurement time setting processing according to a third exemplary embodiment.

A sequence diagram of measurement processing for measuring the communication bandwidth (BW) on a regular basis executed by the client device 40 is shown in FIG. 10.

As shown in FIG. 10, as preprocessing, the client device 40 first executes measurement time setting processing for setting the time interval (T) and the measurement time (τ) at and for which the communication bandwidth (BW) measured (S301). Details of this measurement time setting processing are indicated by the flowchart of FIG. 7, and an explanation thereof will thus be omitted here.

If the update timing for updating the communication bandwidth (BW) has not yet arrived (S302: N), the client device 40 waits. If the update timing for updating the communication bandwidth (BW) has arrived (S302: Y), the client device 40 accesses the information distribution server 10 and sends a connection establishment request to the information distribution server 10 (S303).

Upon receiving a connection establishment request packet from the client device 40, the information distribution server 10 sends an acknowledgement response (ACK) to the connection establishment request packet to the client device 40 (S304).

Upon receiving the acknowledgement response (ACK) to the connection establishment request packet from the information distribution server 10, the client device 40 mutually identifies a communication port used for communication with the information distribution server 10 (S305).

Then, the client device 40 initializes a timer tA (tA=0) and starts counting the time by using the timer tA (S306). The client device 40 also initializes a timer tB (tB=0) and starts counting the time by using the timer tB (S307). Then, the client device 40 sends a dummy packet to which a time stamp for a sending time is appended to the information distribution server 10 (S308).

Upon receiving the dummy packet from the client device 40, the information distribution server 10 appends a time stamp for a sending time to an acknowledgement response (ACK) to the received dummy packet and sends the acknowledgement response (ACK) to the client device 40 (S309).

Upon receiving the acknowledgement response (ACK) to the dummy packet from the information distribution server 10, the client device 40 calculates a round-trip time (RTT) on the basis of the time interval between the time indicated by the time stamp of the dummy packet and that of the acknowledgement response (ACK), and records the calculated round-trip time (PTT) (S310). If the client device 40 has failed to receive ACK in response to the sent dummy packet, it may assume that packet loss has occurred and also record information concerning the occurrence of packet loss. If the timer tB has not reached $\tau$ (S311: N), the client device 40 returns to S303. If the timer tB has reached $\tau$ (S311: Y), the client device 40 determines whether or not the timer tA has reached T (S312).

If the timer tA has not reached T in S312 (S312: N), the client device 40 waits until the timer tA reaches T. If the timer tA has reached T (S312: Y), the client device 40 determines whether or not a measurement completion condition is satisfied (S313). For example, if the number of times dummy packets have been sent is equal to or greater than a number threshold, or if the time elapsed after measurements have started is equal to or greater than a time threshold, the client device 40 may determine that the measurement completion condition is satisfied.

If the measurement completion condition is not satisfied in S313 (S313: N), the client device 40 returns to S306. If the measurement completion condition is satisfied (S313: Y), the client device 40 measures the communication bandwidth (BW) on the basis of the recorded RTT and the packet loss ratio (p) (S314). For example, the communication bandwidth (BW) may be calculated by, for example, the above-described equation (1).

The client device 40 stores the calculated latest communication bandwidth (BW) in the storage unit 42 (overwrites the communication bandwidth (BW) in the storage unit 42), and then returns to S302. The above-described processing refers to measurement processing for measuring the communication bandwidth (BW) on a regular basis executed by the client device 40.

Processing to be executed when the client device 40 sends a video distribution request to the information distribution server 10 in the third exemplary embodiment will now be described below with reference to the sequence diagram of FIG. 11.

Figure 11:
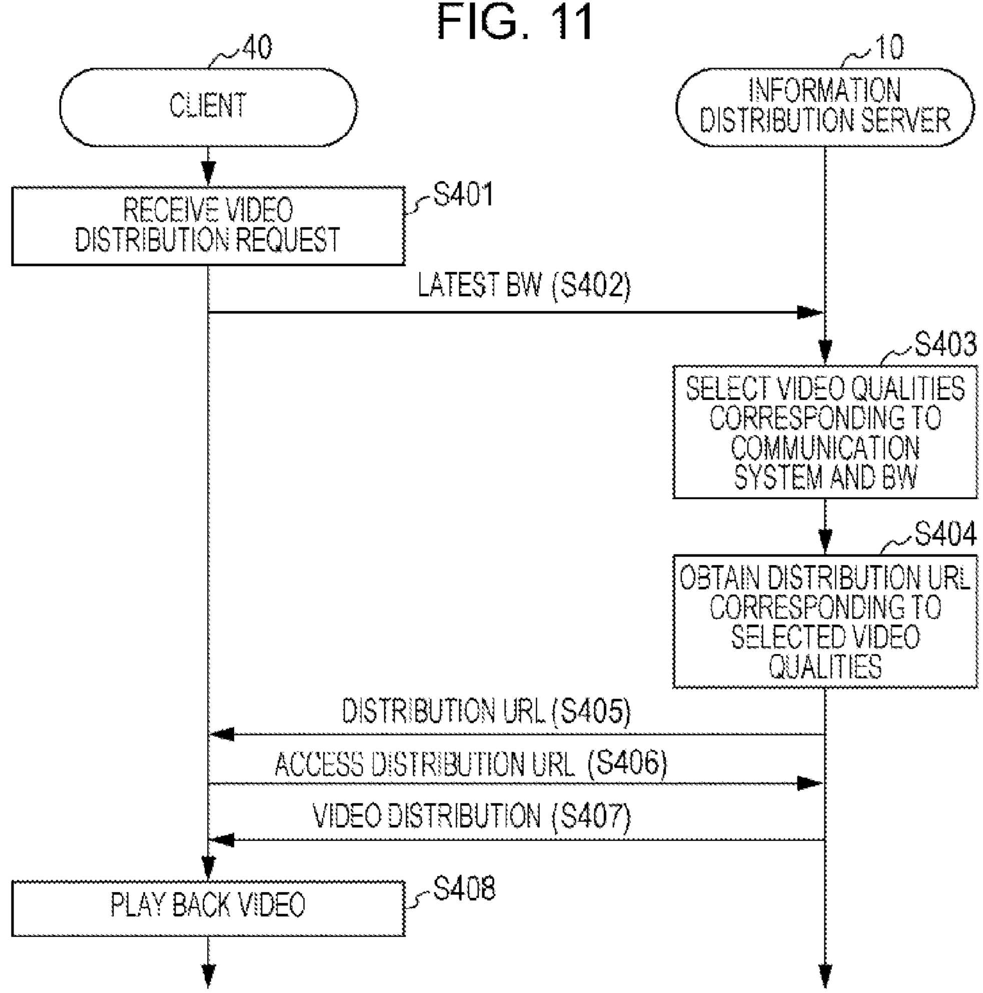
FIG. 11 is a sequence diagram of video distribution processing according to the third exemplary embodiment.

As shown in FIG. 11, upon receiving a video distribution request from a user (S401), the client device 40 sends communication status information indicating the latest communication bandwidth (BW) stored in the storage unit 42 to the information distribution server 10 (S402). The communication status information may include information concerning the communication system of wireless communication (for example, the mobile communication system) used by the client device 40.

Upon receiving the communication status information including information concerning the communication system and the communication bandwidth (BW) from the client device 40, the information distribution server 10 selects video qualities corresponding to the above-described communication system and communication bandwidth (BW) for the video data requested by the client device 40 by referring to the video distribution data management table (S403). For example, the information distribution server 10 may determine under which one of the ranks set for each communication system (for example, in mobile communication system A, L (lower than BWA1), M (BWA1 or higher and lower than BMA2), and H (BWA2 or higher)) the communication bandwidth (BW) is classified, and may select video qualities (frame rate, resolution, and bit rate) corresponding to a set of the communication system and the rank.

The information distribution server 10 obtains the distribution URL for distributing the video data of the video qualities selected in S403 from the video distribution data management table (S404), and sends the obtained distribution URL to the client device 40 (S405) so as to redirect the client device 40 to the distribution URL.

The client device 40 accesses the distribution URL sent from the information distribution server 10 (S406), receives the distribution of the video data linked to the distribution. URL from the information distribution server 10 (S407), and plays back the video data (S408).

The above-described processing refers to the flow of the video distribution processing to be executed when the client device 40 sends a video distribution request to the information distribution server 10 in the third exemplary embodiment.

According to the processing of the third exemplary embodiment, since the client device 40 measures and stores the communication bandwidth (BW) in advance, it is able to immediately send the communication bandwidth (BW) to the information distribution server 10 when sending a video distribution request. This makes it possible to reduce the wait time until video is distributed to be shorter than that of the first exemplary embodiment.

The present invention is not restricted to the above-described exemplary embodiments. For example, in the above-described exemplary embodiments, an example in which the client device 40 performs wireless data communication has been discussed. However, the client device 40 may perform wired data communication.

In the third exemplary embodiment, timings at which the client device 40 updates the communication bandwidth (BW) may include, not only regular timings, but also times at which a predetermined event occurs (for example, when a predetermined operation is received from a user or when the base station device 30 to be communicated is changed).

In the above-described exemplary embodiments, an example in which the information distribution server 10 distributes video data to the client device 40 has been discussed. However, data to be distributed is not restricted to video data, and may be another type of data.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. A bandwidth measuring device comprising:

an extracting unit that extracts, as a cutoff frequency, a highest frequency component among frequency components obtained by performing Fourier transform on transition data which indicates a transition of communication congestion traffic with respect to a time in a communication network to be used;

a determining unit that determines, on the basis of a relationship between an error ratio and the number of measurement times in a cycle corresponding to the cutoff frequency, a minimum value of the number of measurement times that satisfy a given error ratio;

a setting unit that sets each of a measurement cycle and a measurement time so as to satisfy both conditions of a maximum value in the measurement cycle determined on the basis of the cutoff frequency and the minimum value of the number of measurement times in the cycle corresponding to the cutoff frequency determined by the determining unit; and a measuring unit that measures a bandwidth of communication performed by using the communication network, on the basis of the measurement cycle and the measurement time set by the setting unit.

2. The bandwidth measuring device according to claim 1, wherein the measuring unit sets the measurement cycle to be ½of the cycle corresponding to the cutoff frequency.

3. The bandwidth measuring device according to claim 1, wherein the relationship between the error ratio e(M) and the number of measurement times M in the cycle corresponding to the cutoff frequency is expressed by $e(M)=1-\text{sinc}(\pi/M)$.

4. The bandwidth measuring device according to claim 1, further comprising:

a sending unit that sends information concerning a bandwidth measured by the measuring unit when requesting an information distribution device connected to the communication network to distribute data; and a receiving unit that receives, from the information distribution device, data of a quality selected corresponding to the information concerning the bandwidth sent by the sending unit.

5. The bandwidth measuring device according to claim 4, wherein the sending unit sends the information concerning the bandwidth measured by the measuring unit after receiving a request to distribute the data.

6. The bandwidth measuring device according to claim 4, further comprising:

a storage unit that stores information concerning a latest bandwidth measured by the measuring unit, wherein the sending unit sends the information concerning the latest bandwidth stored in the storage unit when requesting the information distribution device connected to the communication network to distribute data.

7. The bandwidth measuring device according to claim 1, further comprising:

a sending unit that sends data of a quality selected corresponding to information concerning a bandwidth measured by the measuring unit to a different device connected to the communication network when receiving a request to distribute data from the different device.

8. A bandwidth measuring method comprising:

extracting, as a cutoff frequency, a highest frequency component among frequency components obtained by performing Fourier transform on transition data which indicates a transition of communication congestion traffic with respect to a time in a communication network to be used;

determining, on the basis of a relationship between an error ratio and the number of measurement times in a cycle corresponding to the cutoff frequency, a minimum value of the number of measurement times that satisfy a given error ratio;

setting each of a measurement cycle and a measurement time so as to satisfy both conditions of a maximum value in the measurement cycle determined on the basis of the cutoff frequency and the minimum value of the number of measurement times in the cycle corresponding to the cutoff frequency determined in the determining; and measuring a bandwidth of communication performed by using the communication network, on the basis of the measurement cycle and the measurement time set in the setting.

9. A non-transitory computer readable medium storing a program for causing a computer to execute a bandwidth measuring process, the process comprising:

extracting, as a cutoff frequency, a highest frequency component among frequency components obtained by performing Fourier transform on transition data which indicates a transition of communication congestion traffic with respect to a time in a communication network to be used;

determining, on the basis of a relationship between an error ratio and the number of measurement times in a cycle corresponding to the cutoff frequency, a minimum value of the number of measurement times that satisfy a given error ratio;

setting each of a measurement cycle and a measurement time so as to satisfy both conditions of a maximum value in the measurement cycle determined on the basis of the cutoff frequency and the minimum value of the number of measurement times in the cycle corresponding to the cutoff frequency determined in the determining; and measuring a bandwidth of communication performed by using the communication network, on the basis of the measurement cycle and the measurement time set in the setting.

* * * * *